(12) United States Patent
Iftime et al.

(10) Patent No.: US 8,313,666 B2
(45) Date of Patent: *Nov. 20, 2012

(54) CURABLE INKS COMPRISING POLYMER-COATED MAGNETIC NANOPARTICLES

(75) Inventors: Gabriel Iftime, Mississauga (CA); Naveen Chopra, Oakville (CA); Barkev Keoshkerian, Thornhill (CA); Peter G. Odell, Mississauga (CA); Marcel P. Breton, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/050,383

(22) Filed: Mar. 17, 2011

(65) Prior Publication Data

US 2012/0235078 A1 Sep. 20, 2012

(51) Int. Cl.
C09D 5/23 (2006.01)

(52) U.S. Cl. ........... 252/62.54; 252/62.55; 106/31.32; 106/31.64; 523/160; 523/161; 522/74; 522/90; 522/96; 522/104; 522/106; 522/107; 522/113; 522/114; 522/117; 522/120; 522/121; 522/153; 522/178; 522/182

(58) Field of Classification Search ............... 252/62.54, 252/62.55; 106/31.32, 31.64; 523/160, 161; 522/74, 96, 90, 104, 106, 107, 117, 113, 522/114, 120, 121, 153, 178, 182

See application file for complete search history.

(56) References Cited

U.S. PATENT DOCUMENTS

| | | | |
|---|---|---|---|
| 4,463,034 A | 7/1984 | Tokunaga et al. | |
| 5,866,637 A | 2/1999 | Lorenz | |
| 6,767,396 B2 | 7/2004 | McElligott et al. | |
| 7,153,349 B2 | 12/2006 | Carlini et al. | |
| 7,259,275 B2 | 8/2007 | Belelie et al. | |
| 7,270,408 B2 | 9/2007 | Odell et al. | |
| 7,271,284 B2 | 9/2007 | Toma et al. | |
| 7,276,614 B2 | 10/2007 | Toma et al. | |
| 7,279,506 B2 | 10/2007 | Sisler et al. | |
| 7,279,587 B2 | 10/2007 | Odell et al. | |
| 7,293,868 B2 | 11/2007 | Odell et al. | |
| 7,317,122 B2 | 1/2008 | Carlini et al. | |
| 7,323,498 B2 | 1/2008 | Belelie et al. | |
| 7,384,463 B2 | 6/2008 | Norsten et al. | |
| 7,449,515 B2 | 11/2008 | Belelie et al. | |
| 7,459,014 B2 | 12/2008 | Breton et al. | |
| 7,531,582 B2 | 5/2009 | Toma et al. | |
| 7,538,145 B2 | 5/2009 | Belelie et al. | |
| 7,541,406 B2 | 6/2009 | Banning et al. | |
| 7,553,011 B2 | 6/2009 | Odell et al. | |
| 7,556,844 B2 | 7/2009 | Iftime et al. | |
| 7,559,639 B2 | 7/2009 | Belelie et al. | |
| 7,563,489 B2 * | 7/2009 | Carlini et al. | 427/466 |
| 7,578,587 B2 | 8/2009 | Belelie et al. | |
| 7,625,956 B2 * | 12/2009 | Odell et al. | 522/173 |
| 7,632,546 B2 | 12/2009 | Odell et al. | |
| 7,674,842 B2 | 3/2010 | Belelie et al. | |
| 7,681,966 B2 | 3/2010 | Parker et al. | |
| 7,683,102 B2 | 3/2010 | Odell et al. | |
| 7,690,782 B2 | 4/2010 | Odell | |
| 7,691,920 B2 | 4/2010 | Belelie et al. | |
| 7,699,922 B2 | 4/2010 | Breton et al. | |
| 7,714,040 B2 | 5/2010 | Toma et al. | |
| 7,754,779 B2 | 7/2010 | Odell et al. | |
| 7,812,064 B2 | 10/2010 | Odell et al. | |
| 7,820,731 B2 | 10/2010 | Odell et al. | |
| 2007/0249747 A1 | 10/2007 | Tsuji et al. | |
| 2009/0321676 A1 * | 12/2009 | Breton et al. | 252/62.53 |
| 2010/0015472 A1 | 1/2010 | Bradshaw et al. | |

FOREIGN PATENT DOCUMENTS

WO WO 2008/148201 * 12/2008

OTHER PUBLICATIONS

U.S. Appl. No. 12/765,148, filed Apr. 22, 2010, entitled "Amide Gellant Compounds with Aromatic End Groups," for Chopra et al.

* cited by examiner

*Primary Examiner* — Carol M Koslow
(74) *Attorney, Agent, or Firm* — Pillsbury Winthrop Shaw Pittman LLP

(57) ABSTRACT

There is provided novel curable ink compositions comprising polymer-coated magnetic metal nanoparticles. In particular, there is provided ultraviolet (UV) curable gel inks comprising at least the coated magnetic metal nanoparticles, one curable monomer, a radiation activated initiator that initiates polymerization of curable components of the ink, a gellant. The inks may also include optional colorants and one or more optional additives. These curable gel UV ink compositions can be used for ink jet printing in a variety of applications.

19 Claims, 1 Drawing Sheet

CURABLE INKS COMPRISING POLYMER-COATED MAGNETIC NANOPARTICLES

CROSS REFERENCE TO RELATED APPLICATIONS

Reference is made to commonly owned and co-pending, U.S. patent application Ser. No. 13/050,268 entitled "Curable Inks Comprising Inorganic Oxide-Coated Magnetic Nanoparticles" to Iftime et al.; U.S. patent application Ser. No. 13/050,423 entitled "Curable Inks Comprising Coated Magnetic Nanoparticles" to Iftime et al.; U.S. patent application Ser. No. 13/050,223 entitled "Solvent-Based Inks Comprising Coated Magnetic Nanoparticles" to Iftime et al.; U.S. patent application Ser. No. 13/050,403 entitled "Magnetic Curable Inks" to Iftime et al.; U.S. patent application Ser. No. 13/049,936 entitled "Phase Change Magnetic Ink Comprising Carbon Coated Magnetic Nanoparticles And Process For Preparing Same," to Iftime et al.; U.S. patent application Ser. No. 13/049,937 entitled "Solvent Based Magnetic Ink Comprising Carbon Coated Magnetic Nanoparticles And Process For Preparing Same" to Iftime et al.; U.S. patent application Ser. No. 13/049,942 entitled "Phase Change Magnetic Ink Comprising Coated Magnetic Nanoparticles And Process For Preparing Same" to Iftime et al.; U.S. patent application Ser. No. 13/049,945 entitled "Phase Change Magnetic Ink Comprising Inorganic Oxide Coated Magnetic Nanoparticles And Process For Preparing Same" to Iftime et al.; U.S. patent application Ser. No. 13/050,341 entitled "Curable Inks Comprising Surfactant-Coated Magnetic Nanoparticles" to Iftime et al.; U.S. patent application Ser. No. 13/050,152 entitled "Solvent-Based Inks Comprising Coated Magnetic Nanoparticles" to Iftime et al.; U.S. patent application Ser. No. 13/049,950 entitled "Phase Change Magnetic Ink Comprising Surfactant Coated Magnetic Nanoparticles and Process for Preparing the Same" to Iftime et al.; and U.S. patent application Ser. No. 13/049,954 entitled "Phase Change Magnetic Ink Comprising Polymer Coated Magnetic Nanoparticles and Process for Preparing the Same" to Iftime et al., all filed electronically on the same day as the present application, the entire disclosures of which are incorporated herein by reference in its entirety.

BACKGROUND

Non-digital inks and printing elements suitable for Magnetic Ink Character Recognition (MICR) printing are generally known. The two most commonly known technologies are ribbon-based thermal printing systems and offset technology. For example, U.S. Pat. No. 4,463,034 discloses heat sensitive magnetic transfer element for printing MICR, comprising a heat resistant foundation and a heat sensitive imaging layer. The imaging layer is made of ferromagnetic substance dispersed in a wax and is transferred on a receiving paper in the form of magnetic image by a thermal printer which uses a ribbon. U.S. Pat. No. 5,866,637 discloses formulations and ribbons which employ wax, binder resin and organic molecule based magnets which are to be employed for use with a thermal printer which employs a ribbon. MICR ink suitable for offset printing using a numbering box are typically thick, highly concentrated pastes consisting for example in about over 60% magnetic metal oxides dispersed in a base containing soy-based varnishes. Such inks are, for example, commercially available at Heath Custom Press (Auburn, Wash.). Digital water-based ink-jet inks composition for MICR applications using a metal oxide based ferromagnetic particles of a particle size of less than 500 microns are disclosed in U.S. Pat. No. 6,767,396. Water-based inks are commercially available from Diversified Nano Corporation (San Diego, Calif.).

The present embodiments are directed to curable inks. Curable inks generally comprise at least one curable monomer, a colorant, and a radiation activated initiator that initiates polymerization of curable components of the ink. In particular, the curable ink is a ultraviolet (UV) curable liquid or gel ink. In particular, the curable ink is an ultraviolet (UV) curable ink. These UV curable liquid or gel ink compositions can be used for ink jet printing in a variety of applications. In addition to providing desirable ink qualities, the present embodiments are directed to magnetic inks for use in specific applications. The curable UV ink of the present embodiments comprises magnetic nanoparticles that are coated with polymeric materials to prevent the exposure of the nanoparticles to oxygen.

UV curable gel inks are known. They are for example disclosed in, for example, U.S. Pat. Nos. 7,153,349, 7,259,275, 7,270,408, 7,271,284, 7,276,614, 7,279,506, 7,279,587, 7,293,868, 7,317,122, 7,323,498, 7,384,463, 7,449,515, 7,459,014, 7,531,582, 7,538,145, 7,541,406, 7,553,011, 7,556,844, 7,559,639, 7,563,489, 7,578,587, 7,625,956, 7,632,546, 7,674,842, 7,681,966, 7,683,102, 7,690,782, 7,691,920, 7,699,922, 7,714,040, 7,754,779, 7,812,064, and 7,820,731, the disclosures of each of which are totally incorporated herein by reference. UV curable gel inks can exhibit desirable characteristics such as improved hardness and scratch-resistance and improved adhesion to various substrates. Curable gel inks can also exhibit advantages in that dot spread of the ink can be controlled, the ink does not bleed excessively into the substrate, including porous substrates.

The present embodiments are directed to UV curable magnetic inks which comprise polymer coated metal nanoparticles. These magnetic inks are required for specific applications such as Magnetic Ink Character Recognition (MICR) for automated check processing and security printing for document authentication. One of the inherent properties of uncoated magnetic metal nanoparticles which precludes their use in the fabrication of commercial inks is their pyrophoric nature; uncoated (bare) magnetic nanoparticles of a certain size, typically in the order of a few tens of nanometers or less, ignite spontaneously when exposed to oxygen in the ambient environment. As such, uncoated magnetic metal nanoparticles are a serious fire hazard. As such, large scale production of the UV curable inks comprising such particles is difficult because air and water need to be completely removed when handling the particles. In addition, the ink preparation process is particularly challenging with magnetic pigments because inorganic magnetic particles are incompatible with organic base components.

Thus, while the disclosed curable ink formulation provides some advantages over the prior formulations, there is still a need to achieve a formulation that not only provides the desirable properties of a curable ink and a curable liquid or gel UV ink in particular, but it is also magnetic. Furthermore there is a need to achieve a magnetic curable ink formulation that is easily produced and derived from components that do not require special handling conditions.

SUMMARY

According to embodiments illustrated herein, there is provided novel curable ink compositions comprising polymer coated magnetic metal nanoparticles. A particular embodiment provides gel UV curable ink compositions.

In particular, the present embodiments provided an ink comprising: a curable ink carrier comprising a monomer, a photoinitiator, an optional curable oligomer, and one or more optional additives; coated magnetic nanoparticles, wherein the coated magnetic nanoparticles are comprised of a magnetic metal core and a protective coating disposed on the magnetic metal core, wherein the protective coating comprises a polymeric material; and an optional colorant.

In further embodiments, there is provided an ink comprising: a curable ink carrier comprising a monomer, a photoinitiator, an optional curable oligomer, and one or more optional additives; coated magnetic nanoparticles, wherein the coated magnetic nanoparticles are comprised of a magnetic metal core and a protective coating disposed on the magnetic metal core, wherein the protective coating comprises a polymeric material; a gellant; and an optional colorant.

In yet other embodiments, there is provided an ink comprising: a curable ink carrier comprising a monomer, a photoinitiator, an optional curable oligomer, and one or more optional additives; coated magnetic nanoparticles, wherein the coated magnetic nanoparticles are comprised of a magnetic metal core and a protective coating disposed on the magnetic metal core, wherein the protective coating comprises a polymeric material; and an optional colorant, wherein the ink is used for Magnetic Ink Character Recognition applications.

BRIEF DESCRIPTION OF THE DRAWINGS

For a better understanding of the present embodiments, reference may be had to the accompanying figures.

DETAILED DESCRIPTION

Figure 1:
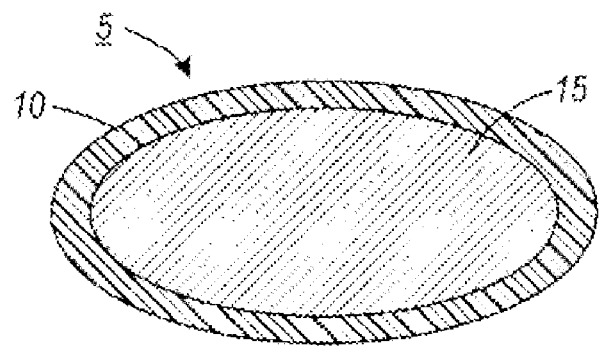
FIG. 1 illustrates a cross-section of a coated magnetic nanoparticle according to the present embodiments.

In the following description, it is understood that other embodiments may be utilized and structural and operational changes may be made without departure from the scope of the present embodiments disclosed herein.

Curable ink technology broadens printing capability and customer base across many markets, and the diversity of printing applications will be facilitated by effective integration of printhead technology, print process and ink materials. As discussed above, while current ink options are successful for printing on various substrates, there is a need for a method to produce magnetic curable inks comprising magnetic metal nanoparticles which reduces the safety risks associated with the nanoparticles.

The present embodiments are directed generally to ultraviolet (UV) curable magnetic inks and in a preferred embodiment to UV curable gel magnetic inks. In particular, the present embodiments provide curable inks that are made with polymer coated magnetic metal nanoparticles dispersed in a UV curable ink base. One of the inherent properties of uncoated magnetic metal nanoparticles which precludes their use in the fabrication of commercial inks is their pyrophoric nature; uncoated (bare) magnetic nanoparticles ignite spontaneously when exposed to oxygen in the ambient environment. For example, bare iron, cobalt and alloys nanoparticles are a serious fire hazard. Thus, the present embodiments provide a safe method for preparation of stable magnetic UV curable inks suitable for applications that require the use of magnetic inks. The present embodiments provide polymer coated magnetic metal nanoparticles which are protected from exposure to water and air. These nanoparticles have a coating of polymeric materials, such as for example, poly (methyl methacrylate) (PMMA), polystyrene, polyesters and the like, which acts as a barrier to water or air. In further embodiments, the polymeric materials are selected from the group consisting of poly(methyl methacrylate), polystyrene, polyesters, polyamides, polyvinylidene chloride, ethylene vinyl alcohol (EVOH), polyethylene, styrene copolymers with p-chlorostyrene, propylene, vinyltoluene, vinylnaphthalene, methyl acrylate, ethyl acrylate, butyl acrylate, octyl acrylate, methyl methacrylate, ethyl methacrylate, butyl methacrylate, methyl α-chloromethacrylate, acrylonitrile copolymer, vinyl methyl ether, vinyl ethyl ether, vinyl methyl ketone, butadiene, isoprene, acrylonitrile-indene, maleic acid, and maleic acid ester; polybutyl methacrylate; polyvinyl chloride; polyvinyl acetate; polypropylene; polyvinyl butyral; polyacrylic resin; rosin; modified rosin; terpene resin; phenolic resin; aliphatic or aliphatic hydrocarbon resin; aromatic petroleum resin; chlorinated paraffin; paraffin wax, and mixtures thereof. In specific embodiments, the protective coating comprises a polymer terminated with a functional group which is selected from the group consisting of amide, amine, carboxylic acid, phosphine oxide, carboxylic ester, alcohol, thiol, and mixtures thereof.

The present embodiments provide several advantages. For example, the coated particles are easier to disperse in the ink base when compared with bare magnetic metal nanoparticles, and thus provides stable dispersions. The ink of the present embodiments is also easy to scale up because it eliminates oxidation processes and consequently the fire hazard associated with uncoated magnetic metal nanoparticles. Thus, the polymer-coated magnetic nanoparticles particles of the present embodiments, when dispersed in an UV curable ink base with optional additives such as dispersants, provide a stable UV curable ink useful for different applications.

Magnetic inks are required for two main applications: (1) Magnetic Ink Character Recognition (MICR) for automated check processing and (2) security printing for document authentication. The resulting curable ink can be used for these applications.

The resulting curable ink can also be applied with piezo type inkjet print heads suitable for both low and high temperature operation Currently only water-based MICR inkjet ink are commercially available. Water based inks require special care of the printhead to prevent evaporation of the ink or deposition of salts within the channel rendering the jetting ineffective. Furthermore high quality printing with aqueous inks generally requires specially treated image substrates. In addition, there is generally a concern with respect to possible incompatibility when operating both UV curable inks and water-based inks within the same printer. Issues like water evaporation due to the proximity to the organic curable heated ink tanks, rust, high humidity sensitivity of the UV ink are key problems which may prevent implementation of the water-based MICR solution. Thus, the present embodiments further avoid these issues.

The present embodiments provide a UV curable ink made from coated metal magnetic nanoparticles dispersed in a UV curable ink base. The ink base may include one or more resins, one or more colorant, and/or one or more additives, such as, a gellant, dispersant and/or a dispersant/synergist combination. In embodiments, the dispersant and/or synergist may not be needed if the polymer coating material provide sufficient dispersibility and stability of the nanoparticles in the ink base. Thus, selection of the dispersant and/or synergist depends on the type of protective coating.

Figure 2:
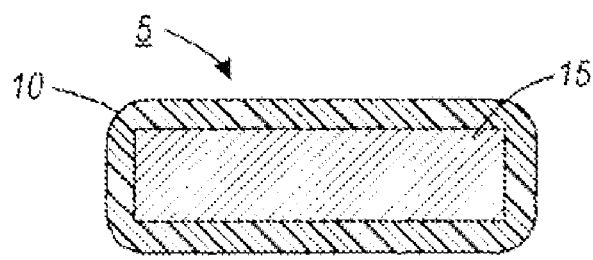
FIG. 2 illustrates a cross-section of a coated magnetic nanoparticle according to an alternative embodiment to FIG. 1.
Figure 3:
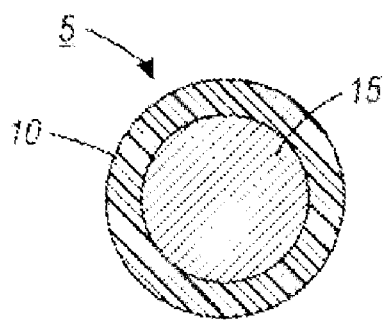
FIG. 3 illustrates a cross-section of a coated magnetic nanoparticle according to an alternative embodiment to FIG. 1 or FIG. 2.

The inks are suitable for use in various applications, including MICR applications. In addition, the printed inks may be used for decoration purposes, even if the resulting inks do not sufficiently exhibit coercivity and remanence suitable for use in MICR applications. They may also be used for security printing applications. The coated magnetic nanoparticles 5 are made of a core magnetic nanoparticle 15 coated on the surface with a coating material 10 as shown in FIGS. 1-3. The coated magnetic nanoparticles can be produced to have different shapes such as oval (FIG. 1), cubed (FIG. 2), and spherical (FIG. 3). The shapes are not limited to those depicted in the figures. Suitable polymer coating materials may include a variety of materials, including for example, amorphous or crystalline, polymers and oligomers with a low molecular weight (for example, a $M_w$ of from about 500 Daltons (Da) to about 5000 Da and an $M_n$ of about 100 Da to 500 Da), polymers with a high molecular weight (for example, a $M_w$ of from about 5000 Da to about 1,000,000 Da and $M_n$ from about 1000 Da to about 1,000,000 Da), homopolymers, copolymers made of one or more types of monomers, and the like and mixtures thereof.

The magnetic ink is made by dispersing the polymer-coated nanoparticles in a UV curable ink base. The coating present on the surface of the nanoparticles provides air and moisture stability such that the nanoparticles are safer to handle.

Coating Materials for Magnetic Metal Nanoparticles

Various polymeric materials may be used for the nanoparticle coating materials, and are suitable for producing protective coating layers for the magnetic metal cores in nanoparticles. Suitable examples include Poly(methyl methacrylate) (PMMA), polystyrene, polyesters, and the like. Other suitable polymer materials include, without limitation, thermoplastic resins, homopolymers of styrene or substituted styrenes such as polystyrene, polychloroethylene, and polyvinyltoluene; styrene copolymers such as styrene-p-chlorostyrene copolymer, styrene-propylene copolymer, styrene-vinyltoluene copolymer, styrene-vinylnaphthalene copolymer, styrene-methylacrylate copolymer, styrene-ethylacrylate copolymer, styrene-butylacrylate copolymer, styrene-octylacrylate copolymer, styrene-methylmethacrylate copolymer, styrene-ethylmethacrylate copolymer, styrene-butylmethacrylate copolymer, styrene-methyl α-chloromethacrylate copolymer, styrene-acrylonitrile copolymer, styrene-vinylmethyl ether copolymer, styrene-vinylethyl ether copolymer, styrene-vinylmethyl ketone copolymer, styrene-butadiene copolymer, styrene-isoprene copolymer, styrene-acrylonitrile-indene copolymer, styrene-maleic acid copolymer, and styrene-maleic acid ester copolymer; polymethylmethacrylate; polybutylmethacrylate; polyvinylchloride; polyvinylacetate; polyethylene; polypropylene; polyester; polyvinylbutyral; polyacrylic resin; rosin; modified rosin; terpene resin; phenolic resin; aliphatic or aliphatic hydrocarbon resin; aromatic petroleum resin; chlorinated paraffin; paraffin wax, and the like. Polymers can be homopolymers or copolymers, linear or branched, random and block copolymers.

In further embodiments, oxygen barrier polymeric materials are particularly suitable coating materials as they effectively block the nanoparticles from exposure to oxygen. Examples of oxygen barrier polymeric materials include polyvinylidene chloride (PVDC), Ethylene Vinyl Alcohol (EVOH), High Density Polyethylene (HDPE), and the like. Suitable oxygen barrier materials are also available from Dow Chemicals (series resins (e.g., 168 and 519)).

Copolymers are also suitable polymeric coating materials. For example, a copolymer made of PVDC and methyl acrylate monomers may be used for coating. This copolymer is also available from Dow Chemicals (e.g., XU 32019). Other examples include 10 L Blend, XU 32019.39 Blend and XU 32019.40 Blend. Additionally, some of the oxygen barrier polymers, particularly copolymers of PVDC with other co-monomers, are soluble in various solvents at various temperatures as shown in Table 1.

TABLE 1

| Polymer Material | Solvent | Temperature at which polymer dissolves (° C.) |
|---|---|---|
| PVDC homopolymer | N-methylpyrrolidine | 42 |
| PVDC homopolymer | tetramethylene sufloxide | 28 |
| PVDC homopolymer | N-acetylpiperidine | 34 |
| PVDC copolymers | tetrahydrofuran | <60 |
| PVDC copolymers | 1,4-dioxane | 50-100 |
| PVDC copolymers | cyclohexanone | 50-100 |

The polymer coating on magnetic nanoparticles provides stability against air and moisture but also increases compatibility of the magnetic particles with the ink base due to the fact that both the polymer coating and the ink base are organic materials. Thus, this compatibility results in good dispersibility of the magnetic nanoparticles as compared to bare magnetic metal nanoparticles. As a result, there may be situations when, depending on the actual ink base components and the type of polymer, a synergist or dispersant may not be required at all or the amount needed is significantly decreased, thus saving extra components and costs.

Coatings and methods for coating particles with polymers layers are described in, for example, Caruso, F., Advanced Materials, 13: 11-22 (2001). Polymer coated nanoparticles can be obtained via synthetic and non synthetic routes: polymerization of the particle surface; adsorption onto the particles; surface modifications via polymerization processes; self-assembled polymer layers; inorganic and composite coatings including precipitation and surface reactions and controlled deposition of preformed inorganic colloids; and use of biomacromolecular layer in specific applications. A number of techniques for the preparation of magnetic nano- and micronized particles are also described in Journal of Separation Science, 30: 1751-1772 (2007).

Polystyrene-coated cobalt nanoparticles are described in U.S. Publication No. 2010/0015472 to Bradshaw, which is hereby incorporated by reference. The disclosed process consists of thermal decomposition of dicobalt octacarbonyl in dichlorobenzene as a solvent in the presence of a polystyrene polymer terminated with a phosphine oxide group and an amine terminated polystyrene, at 160° C. under argon. The process provided magnetic cobalt nanoparticles having a polymer coating including a polystyrene shell. Additionally, other polymer shells can be placed on the surface of the coated cobalt naoparticles by exchange of the original polystyrene shell with other polymers. The reference further describes replacement of the polystyrene shell on coated nanoparticles by polymethylmethacrylate shell, through exchange reaction with polymethylmethacrylate (PMMA) in toluene. These polymer coated magnetic nanoparticle materials are also suitable for fabrication of magnetic inks. U.S. Publication No. 2007/0249747 to Tsuji et al. discloses fabrication of polymer-coated metal nanoparticles from magnetic FePt nanoparticles of a particle size of about 4 nm by stirring FePt nanoparticle dispersion in the presence of a —SH terminated polymer. Suitable polymers include PMMA.

The surface of magnetic nanoparticles can be modified: by grafting; atom transfer radical polymerization (ATRP) and reversible addition-fragmentation chain transfer (RAFT) polymerization techniques (the latter using a chain transfer agent but no metal catalyst); solvent evaporation method; layer by layer process; phase separation method; sol-gel transition; precipitation technique; heterogeneous polymerization in the presence of magnetic particles; suspension/emulsion polymerization; microemulsion polymerization; and dispersion polymerization.

In addition to the known methods described above, a number of specific techniques are of interest, such as for example, use of sonochemistry for chemical grafting of anti-oxidant molecules with additional hydrophobic polymer coating directly onto $TiO_2$ particle surfaces (Chem. Commun., 4815-4817 (2007)); use of pulse-plasma techniques (J. of Macromolecular Science, Part B: Physics, 45: 899-909 (2006)); use of supercritical fluids and anti-solvent process for coating/encapsulation of microparticles with a polymer (J. of Supercritical Fluids, 28: 85-890 (2004)); and use of electrohydrodynamic atomization for the production of narrow-size-distribution polymer-pigment-nanoparticle composites.

Encapsulation/coating and surface modifications of nanoparticles, and particularly magnetic nanoparticles with polymers, also provide useful methods that can be used to fabricate the ink of the present embodiments. For example, polymer-coated iron nanoparticles may be formed by thermal decomposition of iron pentacarbonyl in a solvent in the presence of a modified polymer structure with a terminal anchoring group, tetraethylenepentaamine (TEPA) (Burke et al., Chemical Materials, 14: 4752-61 (2002)). After filtration and solvent removal, the core-shell iron nanoparticles contain a shell made out of the polymeric material, for example, polyisobutylene (PIB), polystyrene (PS), and polyethylene (PE). Polystyrene coated nanoparticles may be obtained by thermal decomposition of iron carbonyl gas in the presence of styrene monomer by using plasma polymerization techniques (Srikanth et al., Applied Physics Letters, 79: 3503-5 (2001)). The plasma generated heat initiates fast decomposition of the iron carbonyl while at the same time the styrene breaks down forming free radicals which initiate the polymerization process on the surface of the generated iron nanoparticles.

The coating is disposed on the surface of the magnetic metal nanoparticles and may have a layer thickness of from about 0.2 nm to about 100 nm, or from about 0.5 nm to about 50 nm, or from about 1 nm to about 20 nm.

Although not limited to the above methods, all of the above methods may be used to provide suitable polymer-coated magnetic nanoparticles needed for fabrication of a magnetic UV curable ink according to the present embodiments.

Magnetic Material

In embodiments, two types of magnetic metal based inks can be obtained by the process herein, depending on the particle size and shape: ferromagnetic ink and superparamagnetic ink.

In embodiments, the metal nanoparticles herein can be ferromagnetic. Ferromagnetic inks become magnetized by a magnet and maintain some fraction of the saturation magnetization once the magnet is removed. The main application of this ink is for Magnetic Ink Character Recognition (MICR) used for checks processing.

In embodiments, the metal nanoparticles herein can be superparamagnetic inks. Superparamagnetic inks are also magnetized in the presence of a magnetic field but they lose their magnetization in the absence of a magnetic field. The main application of superparamagnetic inks is for security printing, although not limited. In this case, an ink containing, for example, magnetic particles as described herein and carbon black appears as a normal black ink but the magnetic properties can be detected by using a magnetic sensor or a magnetic imaging device. Alternatively, a metal detecting device may be used for authenticating the magnetic metal property of secure prints prepared with this ink. A process for superparamagnetic image character recognition (i.e. using superparamagnetic inks) for magnetic sensing is described in U.S. Pat. No. 5,667,924, which is hereby incorporated by reference herein in its entirety.

As described above, the metal nanoparticles herein can be ferromagnetic or superparamagnetic. Superparamagnetic nanoparticles have a remanent magnetization of zero after being magnetized by a magnet. Ferromagnetic nanoparticles have a remanent magnetization of greater than zero after being magnetized by a magnet; that is, ferromagnetic nanoparticles maintain a fraction of the magnetization induced by the magnet. The superparamagnetic or ferromagnetic property of a nanoparticle is generally a function of several factors including size, shape, material selection, and temperature. For a given material, at a given temperature, the coercivity (i.e. ferromagnetic behaviour) is maximized at a critical particle size corresponding to the transition from multidomain to single domain structure. This critical size is referred to as the critical magnetic domain size (Dc, spherical). In the single domain range there is a sharp decrease of the coercivity and remanent magnetization when decreasing the particle size, due to thermal relaxation. Further decrease of the particle size results in complete loss of induced magnetization because the thermal effect become dominant and are sufficiently strong to demagnetize previously magnetically saturated nanoparticles. Superparamagnetic nanoparticles have zero remanence and coercivity. Particles of a size of about and above the Dc are ferromagnetic. For example, at room temperature, the Dc for iron is about 15 nanometers for fcc cobalt is about 7 nanometers and for Nickel the value is about 55 nm. Further, iron nanoparticles having a particle size of 3, 8, and 13 nanometers are superparamagnetic while iron nanoparticles having a particle size of 18 to 40 nanometers are ferromagnetic. For alloys, the Dc value may change depending on the materials. For additional discussion of such details, see U.S. Patent Publication No. 20090321676 to Breton et al.; Burke, et al., Chemistry of Materials, pp. 4752-4761 (2002); B. D. Cullity and C. D. Graham, Introduction to Magnetic Materials, IEEE Press (Wiley), $2^{nd}$ Ed., Chapter 11, Fine Particles and Thin Films, pp. 359-364 (2009); Lu et al. Angew. Chem. Int. Ed. 46:1222-444 (2007), Magnetic Nanoparticles: Synthesis, Protection, Functionalization and Application, which are all hereby incorporated by reference herein in their entirety.

In embodiments, the nanoparticle may be a magnetic metallic nanoparticle, that includes, for example, Co and Fe (cubic), among others. Others include Mn, Ni and/or alloys made of all of the foregoing. Additionally, the magnetic nanoparticles may be bimetallic or trimetallic, or a mixture thereof. Examples of suitable bimetallic magnetic nanoparticles include, without limitation, CoPt, fcc phase FePt, fct phase FePt, FeCo, MnAl, MnBi, mixtures thereof, and the like. Examples of trimetallic nanoparticles can include, without limitation tri-mixtures of the above magnetic nanoparticles, or core/shell structures that form trimetallic nanoparticles such as co-covered fct phase FePt.

The magnetic nanoparticles may be prepared by any method known in the art, including ball-milling attrition of larger particles (a common method used in nano-sized pigment production), followed by annealing. The annealing is generally necessary because ball milling produces amorphous nanoparticles, which need to be subsequently crystallized into the required single crystal form. The nanoparticles can also be made directly by RF plasma. Appropriate large-scale RF plasma reactors are available from Tekna Plasma Systems (Sherbrooke, Québec).

The average particle size of the magnetic nanoparticles may be, for example, about 3 nm to about 300 nm in size in all dimensions. They can be of any shape including spheres, cubes and hexagons. In one embodiment, the nanoparticles are about 5 nm to about 500 nm in size, such as from about 10 nm to about 300 nm, or from 20 nm to about 250 nm, although the amount can be outside of these ranges. Herein, "average" particle size is typically represented as $d_{50}$, or defined as the median particle size value at the $50^{th}$ percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from images of the particles generated by Transmission Electron Microscopy (TEM) or from Dynamic Light Scattering measurements.

The magnetic nanoparticles may be in any shape. Exemplary shapes of the magnetic nanoparticles can include, for example, without limitation, needle-shape, granular, globular, platelet-shaped, acicular, columnar, octahedral, dodecahedral, tubular, cubical, hexagonal, oval, spherical, densdritic, prismatic, amorphous shapes, and the like. An amorphous shape is defined in the context of the present embodiments as an ill-defined shape having recognizable shape. For example an amorphous shape has no clear edges or angles. The ratio of the major to minor size axis of the single nanocrystal (D major/D minor) can be less than about 10:1, such as from about less than about 3:2, or less than about 2:1. In a particular embodiment, the magnetic metal core has a needle-like shape with an aspect ratio of from about 3:2 to about 10:1.

The loading requirements of the magnetic nanoparticles in the ink may be from about 0.5 weight percent to about 30 weight percent, such as from about 5 weight percent to about 10 weight percent, or from about 6 weight percent to about 8 weight percent, although the amount can be outside of these ranges.

The magnetic nanoparticle can have a remanence of about 20 emu/g to about 100 emu/g, such as from about 30 emu/g to about 80 emu/g, or about 50 emu/g to about 70 emu/g, although the amount can be outside of these ranges.

The coercivity of the magnetic nanoparticle can be, for example, about 200 Oersteds to about 50,000 Oersteds, such as from about 1,000 Oersteds to about 40,000 Oersteds, or from about 10,000 Oersteds to about 20,000 Oersteds, although the amount can be outside of these ranges.

The magnetic saturation moment may be, for example, about 20 emu/g to about 150 emu/g, such as from about 30 emu/g to about 120 emu/g, or from about 40 emu/g to about 80 emu/g, although the amount can be outside of these ranges.

Carrier Material

The ink composition also includes a carrier material, or a mixture of two or more carrier materials.

In the case of a radiation (such as ultraviolet light) curable ink composition, the ink composition comprises a curable carrier material, a photoinitiator, an optional colorant, and additional additives. The curable carrier material is typically a curable monomer, curable oligomer, and the like. The curable carrier may, in embodiments, include one or more of these materials, including mixtures thereof. The curable materials are typically liquid at 25° C. The curable ink composition can further include other curable materials, such as a curable wax or the like, in addition to the colorant and other additives described above. The term "curable" refers, for example, to the component or combination being polymerizable, that is, a material that may be cured via polymerization, including, for example, free radical routes, and/or in which polymerization is photoinitiated though use of a radiation sensitive photoinitiator. Thus, for example, the term "radiation curable" refers is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, such as in the presence of photoinitiators and/or sensitizers, curing using e-beam radiation, such as in the absence of photoinitiators, curing using thermal curing in the presence or absence of high temperature thermal initiators (and which are generally largely inactive at the jetting temperature), and appropriate combinations thereof.

Suitable radiation-(such as UV—) curable monomers and oligomers include, but are not limited to, acrylated esters, acrylated polyesters, acrylated ethers, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (Cytec Surface Specialties), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like. Specific examples of suitable acrylated monomers include, but are not limited to) polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, epoxy acrylates, urethane acrylates, amine acrylates, acrylic acrylates, and the like. Mixtures of two or more materials can also be employed as the reactive monomer. Suitable reactive monomers are commercially available from, for example, Sartomer Co., Inc., BASF Corporation, Rahn A G., and the like. In embodiments, the at least one radiation curable oligomer and/or monomer can be cationically curable, radically curable, or the like.

The curable monomer or oligomer in embodiments is included in the ink in an amount of, for example, about 20 to about 90 weight percent of the ink, such as about 30 to about 85 weight percent, or about 40 to about 80 weight percent, although the amount can be outside of these ranges. In embodiments, mixtures of curable monomer optionally with oligomer are selected to have a viscosity at 25° C. of about 1 to about 50 cP, such as about 1 to about 40 cP or about 10 to about 30 cP, although the amount can be outside of these ranges. In one embodiment, the mixture of curable monomer and oligomer has a viscosity at 25° C. of about 20 cP. Also, in some embodiments, it is desired that the curable monomer or oligomer is not a skin irritant, so that uncured ink compositions are not irritable to users.

Initiator

The ink compositions further comprise an initiator. Examples of free radical initiators include benzyl ketones, monomeric hydroxyl ketones, polymeric hydroxyl ketones, α-amino ketones, acyl phosphine oxides, metallocenes, benzophenone, benzophenone derivatives, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl)phosphine oxide, phenyl bis(2,4,6-trimethylbenzoyl)phosphine oxide, benzyl-dimethylketal, isopropylthioxanthone (DAROCUR ITX, available from BASFBASF), 2,4,6-trimethylbenzoyldiphenylphosphine oxide (available as BASF LUCIRIN TPO), 2,4,6-trimethylbenzoylethoxyphenylphosphine oxide (available as BASF LUCIRIN TPO-L), bis(2,4,6-trimethylbenzoyl)-phenylphosphine oxide (available as BASF IRGACURE 819) and other acyl phosphines, 2-methyl-1-(4-methylthio)phenyl-2-(4-morphorlinyl)-1-propanone (available as BASF IRGACURE 907) and 1-(4-(2-hydroxyethoxy)phenyl)-2-hydroxy-2-methylpropan-1-one (available as BASF IRGACURE 2959), 2-benzyl2-dimethylamino1-(4-morpholinophenyl) butanone-1 (available as BASFBASF IRGACURE 369), 2-hydroxy-1-(4-(4-(2-hydroxy-2-methylpropionyl)-benzyl)-phenyl)-2-methylpropan-1-one (available as BASF IRGACURE 127), 2-dimethylamino-2-(4-methylbenzyl)-1-(4-morpholin-4-ylphenyl)-butanone (available as BASF IRGACURE 379), titanocenes, isopropylthioxanthone, 1-hydroxy-cyclohexylphenylketone, 2,4,6-trimethylbenzophenone, 4-methylbenzophenone, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, isopropyl-9H-thioxanthen-9-one, alpha amino ketone (IRGACURE 379), and the like, as well as mixtures thereof.

Optionally, the curable inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

The initiator can be present in the ink in any desired or effective amount, in one embodiment at least about 0.5 percent by weight of the carrier, and in another embodiment at least about 1 percent by weight of the carrier, and in one embodiment no more than about 15 percent by weight of the carrier, and in another embodiment no more than about 10 percent by weight of the carrier, although the amount can be outside of these ranges.

Colorants

The MICR ink as prepared is either black or dark brown. In further embodiments, the MICR ink according to the present disclosure may be further produced as a colored ink by adding a colorant during ink production. Alternatively, a MICR ink lacking a colorant may be printed on a substrate during a first pass, followed by a second pass, wherein a colored ink that is lacking MICR particles is printed directly over the colored ink, so as to render the colored ink MICR-readable. This can be achieved through any means known in the art. For example, each ink can be stored in a separate reservoir. The printing system delivers each ink separately to the substrate, and the two inks interact. The inks may be delivered to the substrate simultaneously or consecutively. Any desired or effective colorant can be employed in the ink compositions, including pigment, dye, mixtures of pigment and dye, mixtures of pigments, mixtures of dyes, and the like. The coated magnetic nanoparticles may also, in embodiments, impart some or all of the colorant properties to the ink composition.

Suitable colorants for use in the MICR ink according to the present disclosure include, without limitation, carbon black, lamp black, iron black, ultramarine, Nigrosine dye, Aniline Blue, Du Pont Oil Red, Quinoline Yellow, Methylene Blue Chloride, Phthalocyanine Blue, Phthalocyanine Green, Rhodamine 6C Lake, Chrome Yellow, quinacridone, Benzidine Yellow, Malachite Green, Hansa Yellow C, Malachite Green hexylate, oil black, azo oil black, Rose Bengale, monoazo pigments, disazo pigments, trisazo pigments, tertiary-ammonium salts, metallic salts of salicylic acid and salicylic acid derivatives, Fast Yellow G3, Hansa Brilliant Yellow 5GX, Disazo Yellow AAA, Naphthbl Red HFG, Lake Red C, Benzimidazolone Carmine HF3CS, Dioxazine Violet, Benzimidazolone Brown HFR. Aniline Black, titanium oxide, Tartrazine Lake, Rhodamine 6G Lake, Methyl Violet Lake, Basic 6G Lake, Brilliant Green lakes, Hansa Yellow, Naphtol Yellow, Watching Red, Rhodamine B, Methylene Blue, Victoria Blue, Ultramarine Blue, and the like.

The amount of colorant can vary over a wide range, for instance, from about 0.1 to about 50 weight percent, or from about 3 to about 20 weight percent, and combinations of colorants may be used.

Additional Additives

The ink of the present embodiments may further contain one or more additives for their known purposes. For example, suitable additives include, a wax, a dispersant, a cross-linking agent, a stabilizer, a viscosity modifier, a clarifier, an antioxidant and a gellant.

Wax

The cured images are very robust and one or more waxes may be added to the MICR inkjet ink. The wax can be present in an amount of, for example, from about 0.1 to about 10 weight percent, or from about 1 to about 6 weight percent based on the total weight of the ink composition, although the amount can be outside of these ranges. Examples of suitable waxes include, but are not limited to, polyolefin waxes, such as low molecular weight polyethylene, polypropylene, copolymers thereof and mixtures thereof. Other examples include a polyethylene wax, a polypropylene wax, a fluorocarbon-based wax (Teflon), or Fischer-Tropsch wax, although other waxes can also be used.

In one specific embodiment the wax can be a curable wax. These waxes can be synthesized by the reaction of a wax containing a transformable functional group, such as carboxylic acid or hydroxyl with a reagent containing curable or polymerizable groups. Suitable examples of waxes containing hydroxyl groups include hydroxyl-terminated polyethylene waxes and Guerbet alcohols which are characterized as 2,2-dialkyl-1 ethanols. Suitable waxes containing carboxylic acid transformable group include carboxylic acid terminated polyethylenes and Guerbet acids which are characterized as 2,2-dialkyl ethanoic acids. The curable groups present can include, but are not limited to, acrylate, methacrylate, alkene, alkyne, vinyl, and allylic ether.

The wax can be present in the ink in any desired or effective amount, in one embodiment at least about 1 percent, in another embodiment at least about 2 percent, and in yet another embodiment at least about 3 percent, and in one embodiment no more than about 40 percent, in another embodiment no more than about 30 percent, and in yet another embodiment no more than about 20 percent, by weight of the ink carrier, although the amounts can be outside of these ranges.

Gellant

The ink composition can also optionally contain a gellant. The gellant can function to increase dramatically the viscosity of the radiation curable phase change ink within a desired temperature range. In particular, the gellant can form a semi-solid gel in the ink carrier at temperatures below the specific temperature at which the ink is jetted. The semi-solid gel phase in a specific embodiment is a physical gel that exists as a dynamic equilibrium comprising one or more solid gellant molecules and a liquid solvent. The semi-solid gel phase is believed to be a dynamic networked assembly of molecular components held together by non-covalent bonding interactions such as hydrogen bonding, Van der Waals interactions, aromatic non-bonding interactions, ionic or coordination bonding, London dispersion forces, or the like, which upon stimulation by physical forces such as temperature or mechanical agitation or chemical forces such as pH or ionic strength, can undergo a reversible transition from liquid to semi-solid state at the macroscopic level. The inks exhibit a thermally reversible transition between the semi-solid gel state and the liquid state when the temperature is varied above or below the gel phase transition of the ink. This reversible cycle of transitioning between semi-solid gel phase and liquid phase can be repeated many times in the ink formulation. Mixtures of one or more gellants can be used to effect the phase-change transition.

Specific examples of gellants include curable amide gellants as disclosed in U.S. Pat. No. 7,714,040, trans-1,2-cyclohexane bis(urea-urethane) compounds as disclosed in, for example, U.S. Pat. No. 7,153,349, curable epoxy-polyamides as disclosed in, for example, U.S. Pat. No. 7,563,489, the disclosure of all of which are totally incorporated herein by reference.

Examples of suitable gellant materials include, but are not limited to, curable amide gellants as disclosed in U.S. Pat. No. 7,714,040, the disclosure of which is totally incorporated herein by reference, such as those of the formula

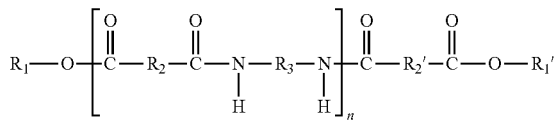

wherein:

$R_1$ and $R_1'$ each, independently of the other, is: (i) an alkyl group, (ii) an arylalkyl group, or (iii) an alkylaryl group; $R_2$ and $R_2'$ each, independently of the other, are: (i) alkylene groups, (ii) arylene groups, (iii) arylalkylene groups, or (iv) alkylarylene groups; $R_3$ is: (i) an alkylene group, (ii) an arylene group, (iii) an arylalkylene group, or (iv) an alkylarylene group; and n is an integer representing the number of repeat amide units, being in one embodiment at least 1, and in one embodiment no more than about 20, in another embodiment no more than about 15, and in yet another embodiment no more than about 10, although the value of n can be outside of these ranges.

Other examples of suitable gellants are compounds are those described in U.S. Pat. Nos. 7,276,614 and 7,279,587, the entire disclosures of which are incorporated herein by reference.

As described in U.S. Pat. No. 7,279,587, the amide gellant may be a compound of the formula

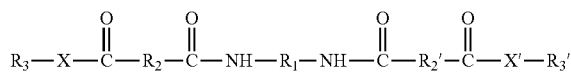

wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups having from about 1 carbon atom to about 54 carbon atoms, such as from about 1 carbon atom to about 48 carbon atoms or from about 1 carbon atom to about 36 carbon atoms, (ii) arylene groups having from about 5 carbon atoms to about 15 carbon atoms, such as from about 5 carbon atoms to about 13 carbon atoms or from about 5 carbon atoms to about 10 carbon atoms, (iii) arylalkylene groups having from about 6 carbon atoms to about 32 carbon atoms, such as from about 7 carbon atoms to about 33 carbon atoms or from about 8 carbon atoms to about 15 carbon atoms, or (iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

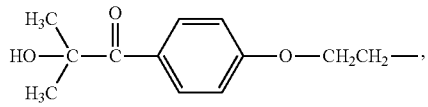

groups derived from 1-hydroxycyclohexylphenylketone, of the formula

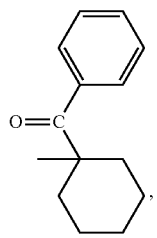

groups derived from 2-hydroxy-2-methyl-1-phenylpropan-1-one, of the formula

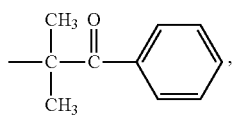

groups derived from N,N-dimethylethanolamine or N,N-dimethylethylenediamine, of the formula

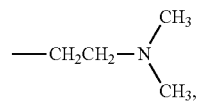

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring; and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

In certain embodiments, the gellant may be a polyamide with the general structure:

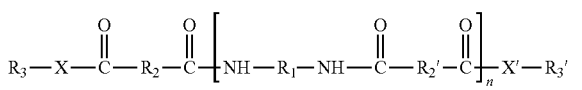

wherein n is an integer between 1 and 5; $R_1$ is (i) an alkylene group, (ii) an arylene group, (iii) an arylalkylene group (iv) an alkylarylene group;

$R_2$ and $R_2'$ each, independently of the other, are (i) alkylene groups (ii) arylene groups, (iii) arylalkylene groups (iv) alkylarylene groups; and $R_3$ and $R_3'$ each, independently of the other, are either (A) photoinitiating groups, or (B) groups which are (i) alkyl groups, (ii) aryl groups (iii) arylalkyl groups (iv) alkylaryl groups; and X and X' each, independently of the other, is an oxygen atom or a group of the formula $NR_4$, wherein $R_4$ is (i) a hydrogen atom, (ii) an alkyl group, (iii) an aryl group, (iv) an arylalkyl group, or (v) an alkylaryl group.

Also suitable as gellants are aromatic ester-terminated diamide compounds of the formula

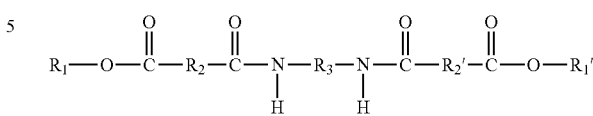

wherein $R_1$ and $R_1'$ can be the same or different and wherein $R_1$ and $R_1'$ each, independently of the other, can be groups such as

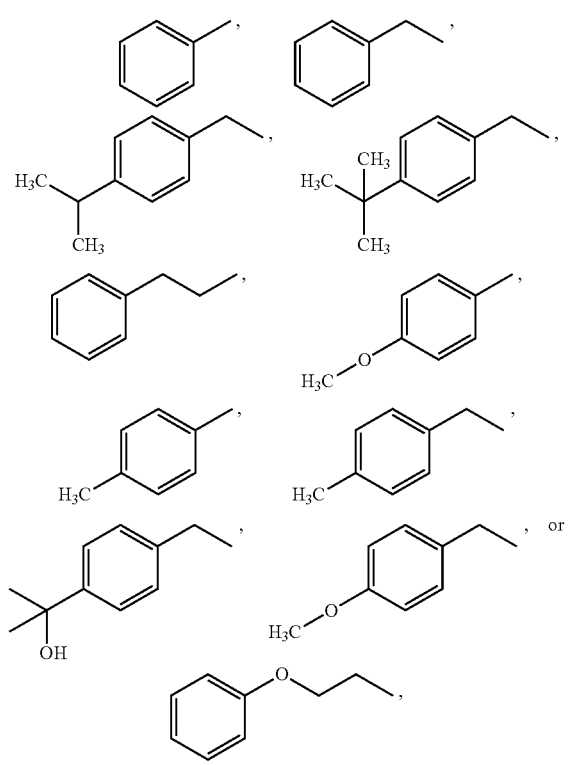

Also suitable as gellants are trans-1,2-cyclohexane bis (urea-urethane) compounds as disclosed in, for example, U.S. Pat. No. 7,153,349, the disclosure of which is totally incorporated herein by reference, such as those of the formula

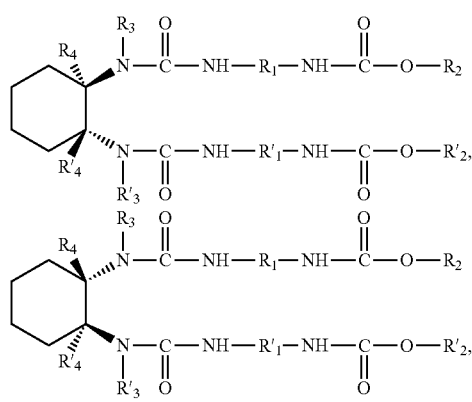

Antioxidant

The ink composition can also optionally contain an antioxidant. The optional antioxidants of the ink compositions protect the images from oxidation and also protect the ink components from oxidation during the heating portion of the ink preparation process. Specific examples of suitable antioxidants include NAUGUARD® series of antioxidants such as NAUGUARD® 445, NAUGUARD® 524, NAUGUARD® 76, and NAUGUARD® 5112 (commercially available from Chemtura Corporation, Philadelphia, Pa.), the IRGANOX® series of antioxidants such as IRGANOX® 10310 (commercially available from BASF), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

Viscosity Modifier

The ink composition can also optionally contain a viscosity modifier. In particular embodiments, the viscosity controlling agent may be selected from the group consisting of aliphatic ketones, such as stearone, and the like, polymers such as polystyrene, polymethylmethacrylate, and the like, and thickening agents such as those available from BYK Chemie. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

Dispersants

Dispersant may be optionally present in then ink formulation. The role of the dispersant is to further ensure improved dispersion stability of the coated magnetic nanoparticles by stabilizing interactions with the coating material. Suitable dispersants include but not limited to, oleic acid, trioctyl phosphine oxide (TOPO), hexyl phosphonic acid (HPA), polyvinylpyrrolidone (PVP), and combinations thereof. Additional suitable dispersants include beta hydroxy carboxylic acids and their esters containing long linear, cyclic or branched aliphatic chains, such as those having about 5 to about 60 carbons, such as pentyl, hexyl, cyclohexyl, heptyl, octyl, nonyl, decyl, undecyl, and the like; sorbitol esters with long chain aliphatic carboxylic acids such as lauric acid, oleic acid (SPAN® 85), palmitic acid (SPAN® 40), and stearic acid (SPAN® 60); polymeric compounds such as polyvinylpyrrolidone, poly(1-vinylpyrrolidone)-graft-(1-hexadecene), poly(1-vinylpyrrolidone)-graft-(1-triacontene), poly(1vinylpyrrolidone-co-acrylic acid), and combinations thereof. In embodiments, the dispersant is selected from the group consisting of oleic acid, lauric acid, palm itic acid, stearic acid, trioctyl phosphine oxide, hexyl phosphonic acid, polymeric compounds like polyvinylpyrrolidone, poly(1-vinylpyrrolidone)-graft-(1-hexadecene), poly(1-vinylpyrrolidone)-graft-(1-triacontene), poly(1vinylpyrrolidone-co-acrylic acid), pentyl, hexyl, cyclohexyl, heptyl, octyl, nonyl, decyl, or undecyl beta-hydroxy carboxylic acid, sorbitol esters with long chain carboxylic acid and combinations thereof. Suitable dispersants also include the SOLSPERSE series from Lubrizol Corp (Wickliffe, Ohio), which comprise sulfonic groups; the EFKA series of dispersants including brand numbers 4340, 4585, 7476, 7496 from BASF; and Byk 2001 or Byk 2155 from Bykchemie.

A suitable amount of dispersant can be selected, such as in an amount of about 0.1 to about 10 weight percent, such as from about 0.2 to about 5 weight percent of the ink weight, although the amount can be outside of these ranges. The choice of particular dispersants or combinations thereof as well as the amounts of each to be used are within the purview of those skilled in the art.

Preparation of Ink

The ink composition of the present disclosure can be prepared by any desired or suitable method. For example, in the case of curable gel UV inks the ink ingredients can be mixed together, followed by heating, typically to a temperature of from about 50° C. to about 100° C., although the temperature can be outside of this range, and stirring until a homogeneous ink composition is obtained, followed by cooling the ink to ambient temperature (typically from about 20° C. to about 25° C.). In the case of liquid ink compositions, the ink ingredients can simply be mixed together with stirring to provide a homogeneous composition, although heating can also be used if desired or necessary to help form the composition. Other methods for making ink compositions are known in the art and will be apparent based on the present disclosure.

Printing of the Ink

The magnetic metal particle ink may generally be printed on a suitable substrate such as, without limitation, paper, glass art paper, bond paper, paperboard, Kraft paper, cardboard, semi-synthetic paper or plastic sheets, such as polyester or polyethylene sheets, and the like. These various substrates can be provided in their natural state; such as uncoated paper, or they can be provided in modified forms, such as coated or treated papers or cardboard, printed papers or cardboard, and the like.

Specific suitable papers include plain papers such as XEROX 4200 papers, XEROX Image Series papers, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like.

Further suitable materials may be used, including but not limited to, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The ink of the present disclosure may be used in both MICR and non-MICR applications.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Fabrication of a Magnetic Ink Concentrate with Polymer Coated Magnetic Nanoparticles 1.a. Polymer Coated Nanoparticles: Polystyrene coated cobalt, nanoparticles are obtained by thermal decomposition of dicobalt octacarbonyl in dichlorobenzene as a solvent in the presence of a polystyrene polymer terminated with a phosphine oxide group, and an amine terminated polystyrene in a ratio of 4:1 (w/w) at 160 deg. C. under argon for 30 min. The reaction mixture is precipitated into hexane and further washed to provide polystyrene coated cobalt nanoparticles. The fabrication process is described in US2010/0015472 A1 (Bradshaw).

1.b. Magnetic Ink Concentrate: To an attritor loaded with zirconia shots (1800 g) is added a propoxylated neopentyl diacrylate curable monomer (SR9003, 57.6 g, obtained from Sartomer Co. Inc., Exeter, Pa.) and 27.4 g of EFKA 4340 (a dispersant consisting of an acrylic block copolymer in methoxypropanol available from BASF; the methoxypropanol was removed by distillation before use). The mixture is stirred at 200 r.p.m. and then to this are added 15 g of polymer coated magnetic nanoparticles (US2010/0015472 A1 (Bradshaw) over a 1 minute period. This mixture is then stirred for 20 hours and then sieved to remove the zirconia shot to afford a 15% dispersion of polymer coated magnetic nanoparticles.

1.c. General Procedure for Fabrication of Curable Gel UV Magnetic Inks

An UV curable phase-change ink containing polymer coated magnetic particles is prepared as follows. To a 600 mL beaker equipped with a magnetic stir bar and enclosed within a jacketed heating mantle is added the monomer(s) and photoinitiators. The mixture is covered with foil and stirred with heating to 90° C. Next, amide gellant and wax are added and stirring is continued until the mixture is homogeneous. This clear ink base is filtered under pressure through a heated 1 µm filter. The filtered ink base is transferred to another 600 mL beaker enclosed within a jacketed heating mantle heated to 90° C. and a homogenizer is immersed. The 15% dispersion of polymer coated magnetic nanoparticles dispersion concentrate is added to the ink base during homogenization and the mixture is blended for 40 minutes. Then the ink is filtered again under pressure through a heated 1 um filter to furnish the final ink.

Ink base compositions are described below for gel inks (Prophetic Example 2) and ink with no gellant (Prophetic Example 3).

Example 2

Magnetic UV Ink Containing Gellant and Wax

An ink composition containing a gellant, which is the same as the one disclosed in Ink Example A of U.S. Pat. No. 7,714,040, the disclosure of which is totally incorporated herein by reference, and wax according to the present embodiments is described in Table 2.

TABLE 2

| Component | Wt % |
|---|---|
| Amide Gellant | 7.5 |
| UNILIN 350 Wax Acrylate | 5 |
| SR399LV Monomer | 5 |
| IRGACURE 379 | 3 |
| IRGACURE 819 | 1 |
| IRGACURE 127 | 3.5 |
| IRGASTAB UV10 | 0.2 |
| 20 wt % Magnetic Particle Dispersion/SR9003 Monomer | 74.8 |
| TOTAL | 100 |

Example 3

Magnetic UV Ink Without Gellant and Wax

An ink composition without gellant and wax according to the present embodiments is described in Table 3.

TABLE 3

| Component | Wt % |
|---|---|
| SR9003 Monomer | 12.5 |
| SR399LV Monomer | 5 |
| IRGACURE 379 | 3 |
| IRGACURE 819 | 1 |
| IRGACURE 127 | 3.5 |
| IRGASTAB UV10 | 0.2 |
| 20 wt % Magnetic Particle Dispersion/SR9003 Monomer | 74.8 |
| TOTAL | 100 |

Magnetic Ink Curing

Drops of the ink from Prophetic Examples or 2 are deposited on paper with a pipette. The drops were cured by passing the ink coated paper under a 600 W Fusion UV Systems, Inc. Lighthammer lamp fitted with a mercury D-bulb at a belt speed of 32 feet per minute. A thin skin is visible on the surface of the droplets indicating that curing has taken place.

SUMMARY

In summary, the present embodiments provide a magnetic UV curable ink compositions made by using polymer-coated magnetic nanoparticles dispersed in an UV curable ink base with optional colorants. The coating material may include a variety of polymeric materials and may be fabricated in a number of ways, as described herein. The inks are suitable for MICR and security applications. Moreover, the use of stabilized magnetic nanoparticles allows for safe and scalable magnetic UV curable ink fabrication by using processes generally suitable for pigmented inks as the protected particles are a reduced fire hazard when compared with bare particles). In addition, UV curable ink bases both with and without phase change gellants are suitable for the various applications.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification

What is claimed is:

1. A black or dark brown ink comprising:
   a curable ink carrier comprising
      a monomer,
      a photoinitiator,
      an optional curable oligomer, and
      one or more optional additives;
   coated magnetic nanoparticles, wherein the coated magnetic nanoparticles are comprised of a magnetic metal core and a protective coating disposed on the magnetic metal core, wherein the protective coating comprises a polymeric material, wherein the coated magnetic nanoparticles is present in an amount of about 0.5 weight percent to about 30 weight percent of the ink and further wherein the protective coating comprises a polymer terminated with a functional group which is selected from the group consisting of amide, amine, carboxylic acid, phosphine oxide, carboxylic ester, alcohol, thiol, and mixtures thereof; and
   an optional colorant.

2. The ink according to claim 1, wherein the magnetic metal core is selected from the group consisting of Fe, Mn, Co, Ni, FePt, CoPt, MnAl, MnBi and mixtures thereof.

3. The ink according to claim 1, wherein the polymeric materials are selected from the group consisting of amorphous homopolymers and copolymers, crystalline homopolymers and copolymers, polymers and oligomers with a $M_w$ of from about 500 Daltons to about 5000 Daltons and an $M_n$ from about 100 to 500, polymers and oligomers with a $M_w$ of from about 5000 Daltons to about 1,000,000 Daltons and an $M_n$ from about 1000 to 1,000,000, and mixtures thereof.

4. The ink according to claim 3, wherein the polymeric materials are selected from the group consisting of poly(m-ethyl methacrylate), polystyrene, polyesters, polyamides, polyvinylidene chloride, ethylene vinyl alcohol (EVOH), polyethylene, styrene copolymers with p-chlorostyrene, propylene, vinyltoluene, vinylnaphthalene, methyl acrylate, ethyl acrylate, butyl acrylate, octyl acrylate, methyl methacrylate, ethyl methacrylate, butyl methacrylate, methyl α-chloromethacrylate, acrylonitrile copolymer, vinyl methyl ether, vinyl ethyl ether, vinyl methyl ketone, butadiene, isoprene, acrylonitrile-indene, maleic acid, and maleic acid ester; polybutyl methacrylate; polyvinyl chloride; polyvinyl acetate; polypropylene; polyvinyl butyral; polyacrylic resin; rosin; modified rosin; terpene resin; phenolic resin; aliphatic or aliphatic hydrocarbon resin; aromatic petroleum resin; chlorinated paraffin; paraffin wax, and mixtures thereof.

5. The ink according to claim 3, wherein the polymeric material is an oxygen barrier material.

6. The ink according to claim 1, wherein the protective coating has a thickness of from about 0.2 nm to about 100 nm.

7. The ink according to claim 1, wherein the magnetic nanoparticles have a remanence of about 20 emu/gram to about 100 emu/gram.

8. The ink according to claim 1, wherein the magnetic nanoparticles have a coercivity of about 200 Oersteds to about 50,000 Oersteds.

9. The ink according to claim 1, wherein the magnetic nanoparticles have a magnetic saturation moment of from about 20 emu/gram to about 150 emu/gram.

10. The ink according to claim 1, wherein a size of the nanoparticles in all dimensions is about 3 nm to about 300 nm.

11. The ink according to claim 1, wherein the magnetic metal core has a shape selected from the group consisting of needle-shaped, granular, globular, cube, hexagonal, oval, spherical and amorphous.

12. The ink according to claim 1, wherein the magnetic metal core has a needle-like shape with an aspect ratio of from about 3:2 to about 10:1.

13. The ink according to claim 1, wherein the carrier is present in an amount of about 70 to about 99.5 weight percent and the colorant is present in an amount of about 0.1 to about 50 weight percent of the ink.

14. The ink according to claim 1 wherein the monomer is selected from the group consisting of acrylated esters, acrylated polyesters, acrylated ethers, acrylated polyethers, acrylated epoxies, urethane acrylates, pentaerythritol tetraacrylate, dipentaerythritol pentaacrylate, and mixtures thereof.

15. The ink according to claim 1, wherein the initiator is selected from a group consisting of benzyl ketones, monomeric hydroxyl ketones, polymeric hydroxyl ketones, α-amino ketones, acyl phosphine oxides, metallocenes, benzophenone, benzophenone derivatives, and mixtures thereof.

16. The ink according to claim 1, wherein the one or more additives are selected from the group consisting of a wax, a dispersant, a synergist, a stabilizer, a viscosity modifier, a clarifier, and mixtures thereof.

17. A black or dark brown ink comprising:
    a curable ink carrier comprising
       a monomer,
       a photoinitiator,
       an optional curable oligomer, and
       one or more optional additives;
    coated magnetic nanoparticles, wherein the coated magnetic nanoparticles are comprised of a magnetic metal core and a protective coating disposed on the magnetic metal core, wherein the protective coating comprises a polymeric material, wherein the coated magnetic nanoparticles is present in an amount of about 0.5 weight percent to about 30 weight percent of the ink and further wherein the protective coating comprises a polymer terminated with a functional group which is selected from the group consisting of amide, amine, carboxylic acid, phosphine oxide, carboxylic ester, alcohol, thiol, and mixtures thereof;
    a gellant; and
    an optional colorant.

18. The ink according to claim 17, wherein the gellant is selected from a group consisting of:
    (a) a polyamide with the general structure:

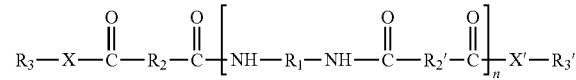

wherein n is an integer between 1 and 5; $R_1$ is (i) an alkylene group, (ii) an arylene group, (iii) an arylalkylene group (iv) an alkylarylene group;
$R_2$ and $R_2'$ each, independently of the other, are (i) alkylene groups (ii) arylene groups, (iii) arylalkylene groups (iv) alkylarylene groups; and $R_3$ and $R_3'$ each, independently of the other, are either (A) photoinitiating groups, or (B) groups which are (i) alkyl groups, (ii) aryl groups (iii) arylalkyl groups (iv) alkylaryl groups, and X and X' each, independently of the other, is an oxygen atom or a group of the formula $NR_4$, wherein $R_4$ is (i) a hydrogen atom, (ii) an alkyl group, (iii) an aryl group, (iv) an arylalkyl group, or (v) an alkylaryl group;

(b) a curable amide gellant;
(c) an ester-terminated diamide compound; and
(d) a trans-1,2-cyclohexane-bis(urea-urethane) compound.

19. An ink comprising:
a curable ink carrier comprising:
  a monomer,
  a photoinitiator,
  an optional curable oligomer, and
  one or more optional additives;
coated magnetic nanoparticles, wherein the coated magnetic nanoparticles are comprised of a magnetic metal core and a protective coating disposed on the magnetic metal core, wherein the protective coating comprises a polymeric material, and further wherein the polymeric materials are selected from the group consisting of amorphous homopolymers and copolymers, crystalline homopolymers and copolymers, polymers and oligomers with a Mw of from about 500 Daltons to about 5000 Daltons and an Mn from about 100 to 500, polymers and oligomers with a Mw of from about 5000 Daltons to about 1,000,000 Daltons and an Mn from about 1000 to 1,000,000, and mixtures thereof and wherein the polymeric materials are selected from the group consisting of poly(methyl methacrylate), polystyrene, polyesters, polyamides, polyvinylidene chloride, ethylene vinyl alcohol (EVOH), polyethylene, styrene copolymers with p-chlorostyrene, propylene, vinyltoluene, vinylnaphthalene, methyl acrylate, ethyl acrylate, butyl acrylate, octyl acrylate, methyl methacrylate, ethyl methacrylate, butyl methacrylate, methyl α-chloromethacrylate, acrylonitrile copolymer, vinyl methyl ether, vinyl ethyl ether, vinyl methyl ketone, butadiene, isoprene, acrylonitrile-indene, maleic acid, and maleic acid ester; polybutyl methacrylate; polyvinyl chloride; polyvinyl acetate; polypropylene; polyvinyl butyral; polyacrylic resin; rosin; modified rosin; terpene resin; phenolic resin; aliphatic or aliphatic hydrocarbon resin; aromatic petroleum resin; chlorinated paraffin; paraffin wax, and mixtures thereof; and
an optional colorant,
wherein the ink is used for Magnetic Ink Character Recognition (MICR) applications.

* * * * *